United States Patent [19]

Hay et al.

[11] Patent Number: 5,707,675
[45] Date of Patent: Jan. 13, 1998

[54] PREVENTING OFF-FLAVOR IN CERTAIN CARAMEL COLORED BEVERAGES

[75] Inventors: Bruce A. Hay, Groton; Edward K. Watkins, Ledyard, both of Conn.

[73] Assignee: Cultor Food Science, New York, N.Y.

[21] Appl. No.: 592,141

[22] Filed: Jan. 26, 1996

[51] Int. Cl.[6] .................................. A23L 2/56; A23L 2/58
[52] U.S. Cl. .......................... 426/533; 426/548; 426/590; 426/650
[58] Field of Search ................................ 426/250, 533, 426/534, 538, 548, 590, 650

[56] References Cited

PUBLICATIONS

Ranken et al, Food Industries Manual, 23rd ed., Blackie Academic & Professional, New York, pp. 364–365, 1993 (no month available).

*Primary Examiner*—Donald E. Czaja
*Assistant Examiner*—Sean Vincent
*Attorney, Agent, or Firm*—Lane, Aitken & McCann

[57] ABSTRACT

The present invention is directed to a process for the minimization of the development of off flavor or off odor in caramel colored beverages by hydrogenation of the caramel color prior to incorporation into the beverage.

16 Claims, No Drawings

PREVENTING OFF-FLAVOR IN CERTAIN CARAMEL COLORED BEVERAGES

BACKGROUND OF THE INVENTION

The present invention is directed to caramel colored beverages, particularly carbonated beverages in which the development of off-flavor has been avoided or minimized by hydrogenation of the caramel color; and to the method of avoiding or minimizing the development of said off-flavor in said beverages.

The present invention is directed particularly to caramel colored beverages which have been sweetened with alitame.

Alitame is the generic name which has been assigned to 3-(L-aspartyl-D-alaninamido)-2,2,4,4-tetramethylthietane), a high-intensity sweetening agent earlier described by Brennan et al., U.S. Pat. No. 4,411,925. In the field of artificially-sweetened beverages, retention of sweetness and of the original flavor on storage are of utmost importance. The consumer develops a preference for the particular flavor of a particular beverage, and will frequently find any perceptible deviation in that flavor unacceptable. Alitame meets the first of these criteria, retention of sweetness, very well. However, we have now employed a highly sensitive sensory panel test which demonstrates that in certain alitame sweetened acidic beverages containing caramel, such as cola beverages, there is a temperature/time dependent development of an off-flavor, detected by odor after storage (generally at elevated temperatures to accelerate the effects of normal storage conditions).

SUMMARY OF THE INVENTION

In one embodiment, the present invention is directed to a process for the reduction of off flavor or off odor associated with the use of caramel color in beverages comprising hydrogenation of the caramel color prior to incorporation into the beverages to a degree sufficient to reduce said off flavor or said off odor.

Preferred is a process wherein said beverage is cola-flavored.

Also preferred is a process wherein said caramel color is initially in the form of a powder.

Especially preferred is a process wherein said caramel color is in the form of an aqueous solution.

Also especially preferred is a process wherein said hydrogenation of the caramel color is effected in aqueous solution in the presence of a palladium on carbon catalyst at a pressure of from about 1 to about 5 atmospheres and at a temperature of from about 25° to about 50° C.

Further preferred is a process wherein said caramel color is added to a cola-flavored beverage in combination with a high-intensity sweetener.

Especially preferred is a process wherein said high-intensity sweetener is selected from the group consisting of alitame, aspartame, acesulfame-K, saccharin, cyclamates, and sucralose.

Also especially preferred is a process wherein said high-intensity sweetener is alitame.

Also especially further preferred is a process wherein said cola-flavored beverage further contains non-hydrogenated caramel.

In another embodiment, the present invention is directed to a cola-flavored beverage having incorporated therein hydrogenated caramel color.

Preferred is a cola-flavored beverage wherein said cola-flavored beverage is carbonated.

Further preferred is a cola-flavored beverage wherein said cola-flavored beverage is not carbonated.

Further preferred are cola-flavored beverages having incorporated thereinin artificial sweeteners with preferred artificial sweetener selected from the group consisting of alitane, aspartame, acesulfame-K, cyclamates, saccharin, and sucralose.

Further preferred is a process for the reduction of off odor generated from the combination of caramel color and alitame in cola-flavored carbonated beverages comprising hydrogenation of the caramel color prior to incorporation into the cola-flavored beverage to a degree sufficient to reduce said off odor.

In another embodiment, the present invention is also directed to hydrogenated caramel.

DETAILED DESCRIPTION OF THE INVENTION

The present invention is readily carried out. The caramel color is hydrogenated prior to incorporation into the beverage. The caramel color initially may be in the form of a powder or an aqueous solution.

The hydrogenation may be effected under a range of conditions, with preferred conditions being in aqueous solution in the presence of palladium on carbon catalyst at a pressure of from about 1 to 5 atmospheres and at a temperature of from about 25° C. to about 50° C.

The process of the present invention is particularly suited to cola-flavored beverages which have been sweetened with a high-intensity sweetener. The high-intensity sweetener may be alitame, aspartame, acesulfame-K, saccharin, cyclamates, or sucralose.

Having described the invention in general terms, reference is now made to specific examples. It is to be understood that these examples are not meant to limit the present invention, the scope of which is determined by the appended claims.

EXAMPLE 1

Evaluation in Simulated Cola by Triangle Difference Test

Simulated colas containing citrate, phosphate, benzoate, caffeine, flavor oils, antifoam, caramel (either hydrogenated or untreated), and 45 ppm of alitame 2.5 hydrate were stored at 120° F. Control colas of the same composition but without alitame were also held at the same temperature. At various times, a test cola and a control cola were withdrawn for sensory evaluation in a triangle difference test (M. Meilgaard, G. V. Civille, and B. T. Carr, "Sensory Evaluation Techniques," 2nd Edition, CRC Press, Boca Raton, Fla., 1991; pages 60–67). Three randomly coded samples were presented to 12 panelists, with each panelist receiving either two samples of control cola and one sample of test cola or one sample of control cola and two samples of test cola. Each panelist was asked to identify the odd sample according to the following instructions: "Sniff the samples in the order shown. Two samples are exactly the same; one is different. Which of the three samples is different from the other two? if you are not sure, take a guess." If 8 or more of the twelve panelists correctly identified the odd sample, then the alitame-sweetened cola was considered to have been identified at the 95% confidence level and the caramel treatment method (if any) was considered to have been ineffective.

EXAMPLE 2

Evaluation in Simulated Cola by Preference-Difference Test

Simulated colas prepared and stored as in Example 1 were evaluated by a standard preference-difference test (M. Meilgaard, G. V. Civille, and B. T. Carr, "Sensory Evaluation Techniques," 2nd Edition, CRC Press, Boca Raton, Fla., 1991; page 211). Randomly coded samples of the control cola and the test cola were presented to 30 panelists. Each panelist was asked to identify the preferred sample according to the following instructions: "Please indicate your preference of the aroma only. If you do not have a preference, then mark the No Preference box." Results were tabulated as follows: A=Number of panelists who prefer the control cola (without alitame); B=number of panelists who prefer the test cola (with alitame); C=number of panelists indicating No Preference. If C was greater than A minus B, then the colas were considered to be indistinguishable, and the caramel treatment method (if any) was considered to have been effective.

EXAMPLE 3

Hydrogenation of Caramel Color

A solution of 250 grams of Sethness® 11 KDS double strength acid-proof caramel color diluted to 500 milliliters with distilled water was stirred under hydrogen at atmospheric pressure with 25 grams of 10% palladium on carbon catalyst for 1 hour at room temperature. The mixture was filtered through diatomite filteraid (Dicalite, Grefco, Inc.), the filter cake was washed with distilled water, and the combined filtrates were diluted to 1000 milliliters with distilled water.

EXAMPLE 4

Hydrogenation of Caramel Color

Undiluted Sethness® 11 KDS double strength acid-proof caramel color (2000 grams) was stirred under hydrogen at atmospheric pressure with 50 grams of 10% palladium on carbon catalyst for 1 hour at 50° C., and the mixture was filtered through diatomite filteraid (Dicalite, Grefco, Inc.). Colas prepared with the hydrogenated caramel and untreated caramel were stored at 120° F. and evaluated by the procedure of Example 1. After 3 days and also after 6 days, the odd sample was detected at the 95% confidence level in the cola containing untreated caramel, but not in the cola containing hydrogenated caramel.

EXAMPLE 5

Hydrogenation of Caramel Color

Undiluted Sethness® 11 KDS double strength acid-proof caramel color (1000 grams) was stirred under hydrogen at atmospheric pressure with 100 grams of 5% palladium on carbon catalyst for 1 hour at 50° C., and the mixture was filtered through diatomite filteraid (Dicalite, Grefco, Inc.). Colas prepared with the hydrogenated caramel and untreated caramel were stored at 120° F. and evaluated by the procedure of Example 1. After 3 days, and also after 6 days, the odd sample was detected at the 95% confidence level in the cola containing untreated caramel, but not in the cola containing hydrogenated caramel. After 9 days, the odd sample was detected at the 95% confidence level in the cola containing untreated caramel, but not in the cola containing hydrogenated caramel.

EXAMPLE 6

Hydrogenation of Caramel Color

A solution of 50 grams of Sethness® 11 KDS double strength acid-proof caramel color diluted to 100 milliliters with distilled water was stirred under hydrogen at atmospheric pressure with 5 grams of 10% palladium on carbon catalyst for 1 hour at room temperature. The mixture was filtered through diatomite filteraid (Dicalite, Grefco, Inc.), the filter cake was washed with distilled water, and the combined filtrates were diluted to 200 milliliters with distilled water. Colas prepared with the hydrogenated caramel and untreated caramel were stored at 120° F. and evaluated by the procedure of Example 1. After 4 days, after 7 days, and also after 9 days, the odd sample was detected at the 95% confidence level in the cola containing untreated caramel, but not in the cola containing hydrogenated caramel.

EXAMPLE 7

Hydrogenation of Caramel Color

A solution of 5 grams of Sethness® 11 KDS double strength acid-proof caramel color diluted to 50 milliliters with distilled water was shaken at room temperature with 1 gram of 5% palladium on carbon catalyst under a hydrogen pressure 50 psi above atmospheric for 30 minutes, and the mixture was filtered through diatomite filteraid (Dicalite, Grefco, Inc.).

EXAMPLE 8

Hydrogenation of Caramel Color

A solution of 5 grams of Sethness® 11 KDS double strength acid-proof caramel color diluted to 50 milliliters with distilled water was shaken at room temperature with 0.5 gram of 5% palladium on carbon catalyst under a hydrogen pressure 10 psi above atmospheric for 5 minutes, and the mixture was filtered through diatomite filteraid (Dicalite, Grefco, Inc.).

EXAMPLE 9

Hydrogenation of Caramel Color

Undiluted Williamson® 11 KDS caramel color (1000 grams) was shaken at room temperature with 50 grams of 10% palladium on carbon catalyst under a hydrogen pressure 50 psi above atmospheric for 18 hours, and the mixture was filtered through diatomite filteraid (Dicalite, Grefco, Inc.). Colas prepared with the hydrogenated caramel were stored at 120° F. and evaluated by the procedure of Example 2. After 7 days and also after 14 days, the No Preference number (C) was larger than A minus B, indicating that the samples were indistinguishable and that the caramel treatment was effective.

We claim:

1. A cola-flavored beverage made by the steps of
   hydrogenating a caramel color; and
   subsequently incorporating said hydrogenated caramel color into said cola-flavored beverage to a degree sufficient to reduce off flavor or off color.

2. A cola-flavored beverage according to claim 1 wherein said cola-flavored beverage is carbonated.

3. A cola-flavored beverage according to claim 1 wherein said cola-flavored beverage is not carbonated.

4. A cola-flavored beverage according to claim 1 further containing a high-intensity sweetener.

5. A cola-flavored beverage according to claim 4 wherein said high-intensiy sweetener is selected from the group consisting of alitame, aspartame, acesulfame-K, saccharin, cyclamates, and sucralose.

6. A process for the reduction of off flavor or off odor generated from the combination of caramel color and alitame in cola-flavored carbonated beverages comprising hydrogenation of the caramel color prior to incorporation into the cola-flavored beverage to a degree sufficient to reduce said off odor.

7. A process for the reduction of off flavor or off odor associated with the use of caramel color in beverages, comprising the steps of hydrogenating said caramel color to a degree sufficient to reduce said off flavor or said off odor; and subsequently incorporating said hydrogenated caramel color into said beverages.

8. A process according to claim 7 wherein said beverage is cola-flavored.

9. A process according to claim 7 wherein said caramel color is initially in the form of a powder.

10. A process according to claim 7 wherein said caramel color is in the form of an aqueous solution.

11. A process according to claim 7 whereby said hydrogenation of the caramel color is effected in aqueous solution in the presence of a supported or unsupported catalyst selected from the group consisting of palladium, platinum, ruthenium, rhodium and nickel at a pressure of from about 1 to about 300 atmospheres and at a temperature of from about 0° to about 100° C.

12. A process according to claim 7 wherein said hydrogenation of the caramel color is effected in aqueous solution in the presence of a palladium on carbon catalyst at a pressure of from about 1 to about 5 atmospheres and at a temperature of from about 25° to about 50° C.

13. A process according to claim 8, further comprising the step of adding a high-intensity sweetener to said beverage.

14. A process according to claim 13 wherein said high-intnesity sweetener is selected from the group consisting of alitame, aspartame, acesulfame-K, saccharin, cyclamates, and sucralose.

15. A process according to claim 14 wherein said high-intensity sweetener is alitame.

16. A process according to claim 7 wherein said beverage further contains non-hydrogenated caramel.

* * * * *

UNITED STATES PATENT AND TRADEMARK OFFICE
CERTIFICATE OF CORRECTION

PATENT : 5,707,675
DATED : January 13, 1998
INVENTOR(S) : Bruce A. Hay et al It is certified that error appears in the above-identified patent and that said Letters Patent is hereby corrected as shown below:

In column 4, (claim 1) line 63, "reduce off flavor or off color" should be changed to read as --reduce off flavor or off odor--.

Signed and Sealed this

Fifth Day of May, 1998

*Attest:*

BRUCE LEHMAN

*Attesting Officer*   Commissioner of Patents and Trademarks